March 9, 1965 T. C. G. WAGNER 3,173,095

COMPENSATED SIGNAL AMPLIFYING SYSTEM

Filed Dec. 15, 1960

INVENTOR.
THOMAS C. G. WAGNER

BY Arthur H. Swanson

ATTORNEY.

3,173,095
Patented Mar. 9, 1965

3,173,095

COMPENSATED SIGNAL AMPLIFYING SYSTEM

Thomas C. G. Wagner, Montgomery County, Md., assignor to Honeywell Inc., a corporation of Delaware Filed Dec. 15, 1960, Ser. No. 76,047
9 Claims. (Cl. 328—165)

This invention relates to signal amplifiers. More specifically, the present invention relates to signal reproduction compensating amplifiers.

An object of the present invention is to provide an improved signal reproduction compensator for neutralizing the effect of distortion in the reproduction of recorded signals.

Another object of the present invention is to provide an improved signal reproduction compensator for correcting the reproduction of recorded frequency modulated signals.

A further object of the present invention is to provide an improved signal reproduction compensator, as set forth herein, having a simplified operation and construction.

In order to accomplish these and other objects, there has been provided, in accordance with the present invention, a signal reproduction compensator having a first signal amplitude limiting circuit with a controllable limiting level for limiting the amplitude of a signal applied thereto. A frequency modulated input signal carrying desired information signals is applied to the limiting circuit and is limited to the aforesaid limiting level. The limited signal is then applied to a first discriminator circuit, which is sensitive to the amplitude and frequency of the input signal applied thereto, to separate the information signals from the frequency modulated input signal. The control signal for the aforesaid limiting level is obtained from a frequency modulated reference signal which is applied to a second controllable limiting circuit. The reference signal is correlated to the information signal whereby it is affected by any distortion effects present in the information signal as by being recorded on the same medium as the information signal. The limited reference signal is then applied to a second discriminator to separate the reference signal information representative of any distortion effects from the frequency-modulated reference input signal. The separated reference signal is filtered and applied to the first and second limiters as a limiting level signal to compensate the reproduction of the information signal by the first discriminator by affecting the aforesaid amplitude sensitivity of the discriminator.

A better understanding of the present invention may be had from the following detailed description when read in connection with the accompanying drawings in which.

Figure 1:
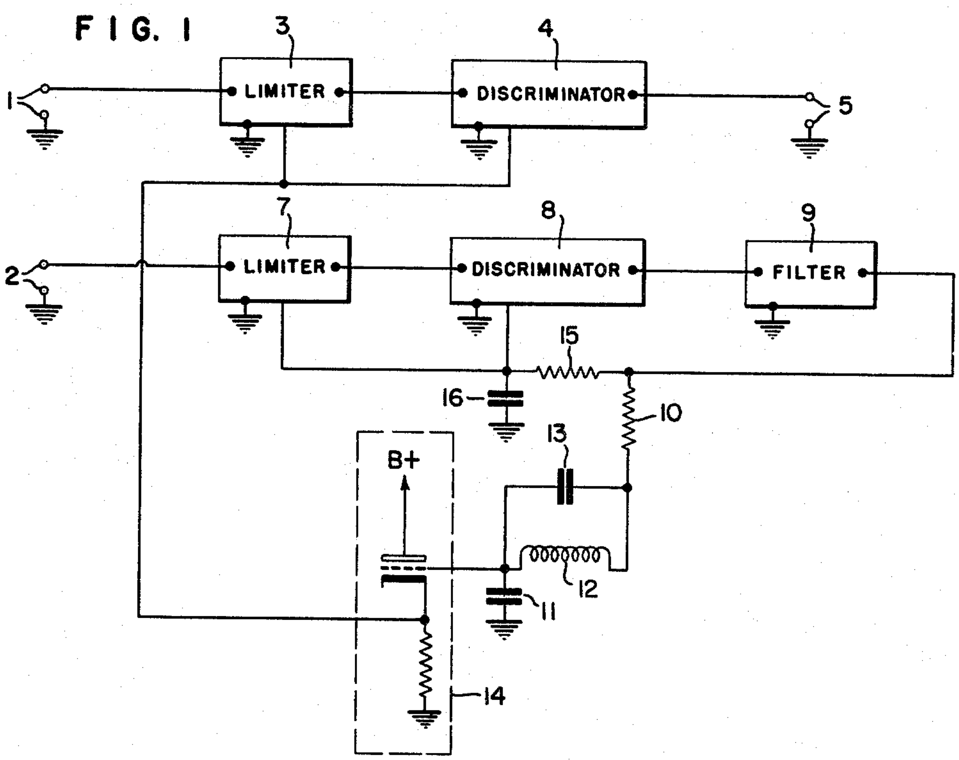
FIG. 1 is a schematic representation of an amplitude compensating amplifier embodying the present invention.

Referring to FIG. 1 in more detail, there is shown a signal compensating amplifier having a first pair of input terminals 1 and a second pair of input terminals 2.

A first limiter 3 is connected between the first terminals 1 and a first discriminator 4. An output circuit of the first discriminator 4 is connected to a pair of output terminals 5.

A second limiter 7 is connected between the second input terminals 2 and a second discriminator 8. An output signal from the second discriminator is applied to a frequency filter 9. An output signal from the filter 9 is applied as a limiting level to the first limiter 3 and as a bias signal to the discriminator 4 through a first R–C network comprising a first resistor 10 and a first capacitor 11, an L–C filter comprising a first inductance 12 and a second capacitor 13 and a cathode follower amplifier 14. The output signal from the filter 9 is also applied as a limiting level to the second limiter 7 and as a bias signal to the second discriminator 8 through a second R–C network comprising a second resistor 15 and a third capacitor 16.

Assume a frequency-modulated signal carrying desired signal information therein is applied to the first input terminals 1 and a frequency-modulated reference signal is applied to the second input terminals 2. Further, assume these signals are interrelated; e.g., signals read from adjacent tracks on a magnetic recording medium such as a tape. The reproduction of such recorded signals may be marred by distortions induced through the mechanical variations in the operation of a transport mechanism. Such variations are caused by instabilities in the speed governing characteristics of the transport and by transient variations in the movement of the recording medium past a reproducing device. The effects of these variations on the reproduced recorded signal are commonly called "wow" and "flutter" and are evidenced by a variation in the frequency and amplitude of the reproduced recorded signal. In the case of a recorded signal using the frequency-modulation recording technique, hereinafter referred to as an FM signal, the variation in frequency is effective to produce an incorrect reproduction of the information signal recorded in the FM signal. Further, the amplitude variation may affect the operation of the apparatus used to separate the information signal from the composite FM signal. Thus, in reproducing the recorded information whereby it is free from the aforesaid effect of "wow" and "flutter," it is desirable to limit the amplitude of the reproduced signal to a preset limit and to extract the information from the composite FM signal with a compensation for any undesirable frequency variations.

The apparatus of the present invention, as shown in FIG. 1, is effective to limit the FM signal applied to first input terminals 1 by means of the first limiter 3. This limited FM signal is subsequently applied to the first discriminator 4 wherein the information signal is separated from the composite FM signal. The first discriminator 4 is arranged to produce an output signal representative of a recorded information signal which output signal amplitude is dependent on the product of the amplitude and frequency of the input FM signal. Thus, a variation in either the amplitude or frequency of the input signal to the first discriminator 4 is effective to vary the amplitude of the discriminator output signal. This output signal is then applied to the output terminals 5.

The first limiter 3, as previously mentioned has a controllable limiting level which level is determined by a control signal applied to the first limiter 3. This control signal is derived from the recorded reference FM signal applied to the second terminals 2. The reference signal, as previously mentioned, is an FM signal which is interrelated to the recorded information FM signal and, thus, exhibits the same "wow" and "flutter" distortions exhibited by the information FM signal. In order to detect these distortions, the reference signal is recorded as a constant amplitude and frequency signal. Thus, any variations in the preset amplitude and frequency of the recorded reference signal during reproduction are a measure of the effect of "wow" and "flutter" in the reproduction process.

The reproduced reference FM signal is applied to the second limiter 7 which is effective to limit the amplitude of the FM signal to the level of an externally applied limit level. The limited FM signal is subsequently applied to a second discriminator 8 which is similar to the aforesaid first discriminator 4. Thus, as previously discussed with respect to the first discriminator 4, the output signal from the second discriminator 8 will be dependent on the product of the amplitude and frequency of the input signal thereto. This output signal is a varying amplitude signal superimposed on a ripple component having a frequency equal to the carrier, or center frequency, of the recorded FM signal; i.e., an alternating current signal having an amplitude which varies in accordance with the aforesaid product of the input signal frequency and amplitude.

This combined signal is applied to the filter 9 to separate the desired amplitude variations from the undesired ripple component. The output signal from the filter 9 is a varying magnitude signal which is fed back to the first and second limiter 7 to provide the limiting level signal therefor. The combination of the previously mentioned R–C and L–C networks in the feedback connections for the limiting level signal are used to provide a lag in the limit signal applied to the second limiter 7 with respect to the limit signal applied ot the first limiter 3. Thus, the limiting action in the first limiter 3 is achieved before any further variation in the limiting level is effected by the reference signal circuit since, as previously mentioned, the output signal from the second discriminator 8 is a product of the input signal amplitude and frequency. Accordingly, the variation in the limiting level is effective to vary the amplitude of the input signal to the second discriminator 8 and the amplitude of the corresponding discriminator output signal. Further, the L–C filter is effective to further filter out any remaining ripple, or carrier frequency, component which may have passed through the filter 9.

Summarizing the operation of the compensating amplifier as shown in FIG. 1, it may be seen that the system is effective to reproduce the recorded information signal through the first limiter 3 and the first discriminator 4. The limiting level of the first limiter 3 is determined by the operation of a reference signal circuit which is sensitive to any "wow" and "flutter" distortions in the reproduction process. In the case of an absence of these distortions, the limiting level is held at a constant value. Accordingly, the output signal from the first discriminator 4, which is sensitive to the amplitude and frequency of an input signal applied thereto, is dependent only on the frequency variations of the recorded information FM signal. If the "wow" and "flutter" distortions are present, the reference signal circuit is effective to produce a varying limiting level signal which has a direct relationship to these distortions. The application of this limiting level signal to the first limiter 3 is effective to vary the amplitude of the input signal to the first discriminator 4. Since the first discriminator 4 is effective to produce an output signal dependent on the amplitude and frequency of the input signal thereto, the variation in the amplitude of this input signal is effective to compensate for a frequency variation produced by "wow" and "flutter" whereby to produce an output signal at the output terminals 5 which is an accurate reproduction of the recorded information signal. For example, assume the distortion effect produced an increase in the frequency of the reproduced information FM signal. Without compensation, the output signal from the first discriminator 4 would increase and produce an erroneous increase in the discriminator output signal. However, the distortion is also effective to increase the frequency of the reference signal which increase is effective to decrease the limiting level signal. This decreased limit level is applied to the first limiter 3 to decrease the product of the frequency and amplitude of the input signal as applied to the first discriminator 4, and the output signal from the first discriminator is, accordingly, at a level indicative of the true frequency of the reproduced information FM signal without the effect of the "wow" and "flutter" distortions. Similarly, a decrease in the frequency of the reproduced information FM signal is compensated by the apparatus of the present invention shown in FIG. 1.

Figures 2, 4:
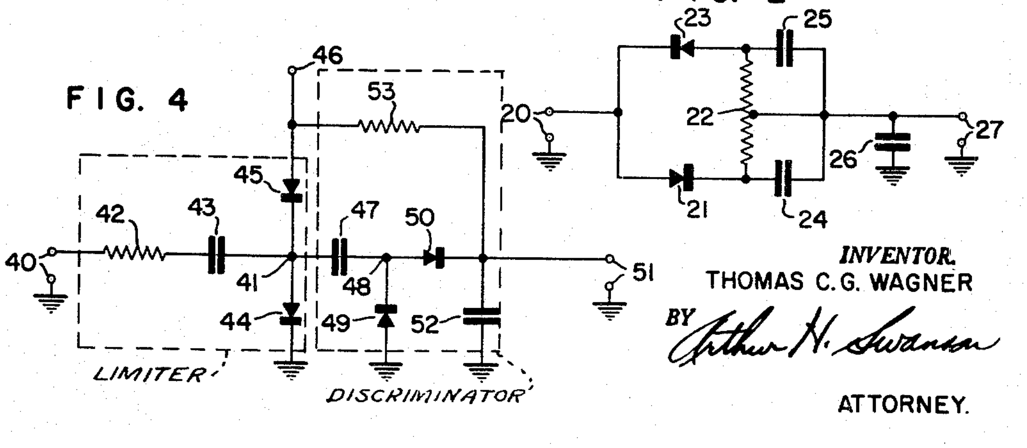
FIG. 2 is a schematic representation of a non-linear filter for use with the amplifier shown in FIG. 1.
FIG. 4 is a schematic representation of a combined limiter and discriminator for use with the amplifier shown in FIG. 1.

A suitable limiter and discriminator circuit for use with the present invention as the first limiter 3 and first discriminator 4 or the second limiter 7 and discriminator 8, of FIG. 1, is shown in FIG. 4.

This limiter-discriminator circuit shown in FIG. 4 includes a pair of input terminals 40 one of which is connected to the common ground connection. The other one of the input terminals 40 is connected to a first discriminator common point 41 through a series combination of an input resistor 42 and an input capacitor 43. A first diode 44 has its anode connected to the first common point 41 and its cathode connected to the common ground connection. A second diode 45 has its cathode connected to the first common point 41 and its anode to a source of limiting level signal at a limit signal input terminal 46. A connecting capacitor 47 is connected between the first common point 41 and a second common point 48. A third diode 49 is connected with its anode connected to the common ground connection and its cathode connected to the second common point 47. A fourth diode 50 has its anode connected to the third common point 48 and its cathode connected to one of a pair of discriminator output terminals 51. The other one of the discriminator output terminals 51 is connected to the common ground connection. A discriminator bypass capacitor 52 is connected between the cathode of the fourth diode 50 and the common ground connection. A bypass resistor 53 is connected between the limit signal input terminal 46 and the cathode of the fourth diode 50.

In discussing the operation of the limiter and discriminator circuit shown in FIG. 4, it may be divided into a limiting circuit and a frequency discriminator circuit. Thus, the input resistor 42, the input capacitor 43, the first diode 44 and the second diode 45 comprise the limiting circuit which circuit is supplied with a limit level signal from the limit signal input terminal 46. The first diode 44 is effective to limit the amplitude of one polarity of an alternating current input signal applied at the input terminals 40 to a ground level. The amplitude of the other polarity of the input signal is limited to the level of a limiting level signal applied to the limiting terminal 46 and the second diode 45. Accordingly, the signal appearing across the connecting capacitor 47 is an oscillatory unidirectional signal limited between the aforesaid limits. The charging path for this capacitor is through the fourth diode 50 and the bypass capacitor 52 while the discharging path is through the third diode 49. The charge attained by the coupling capacitor 47 also appears across the bypass capacitor 52, which bypass capacitor is connected across the output terminals 51. Further, it may be seen that the average charging current for these capacitors over a number of oscillatory variations of the unidirectional signal is directly proportional to the oscillatory frequency. However, as previously discussed, this oscillatory frequency is derived from the input signal frequency which is supplied to the input terminals 40.

The variation in the average charging current for the bypass capacitor 52, is, therefore, representative of a corresponding variation in the frequency of an alternating current input signal supplied to the discriminator circuit. Thus, the signal appearing at the output terminals 51 is representative of the frequency variation of the input signal applied to the discriminator circuit. However, in order to detect a particular frequency of the input signal, i.e., center frequency, the bypass resistor 53 is used to supply a current to the bypass capacitor 52 which current is equal to the average charging current at the center frequency and is in opposition to this charging current. Thus, at the center frequency, a zero amplitude output signal is present at the output terminals 51, while a frequency deviation on either side of the center frequency is effective to produce a representative output signal. This output signal is one which has a magnitude proportional to the deviation from the center frequency and an instantaneous polarity corresponding to the direction of the deviation. Accordingly, the discriminator circuit shown in FIG. 4 may be used to detect the information signal embodied in a frequency-modulated signal applied to the input terminals 40.

A suitable filter circuit for use with the present invention is shown in FIG. 2 and includes a pair of filter input terminals 20 for applying an input signal thereto. A first filter diode 21 has its anode connected to one of the filter input terminals 20 and its cathode connected to one end of a tapped resistor 22. A second filter diode 23 has its cathode connected to the aforesaid anode of the first diode 21 and its anode connected to the other end of the tapped resistor 22. A first filter capacitor 24 is connected between the cathode of the first diode 21 and a tap on the tapped resistor 22. A second filter capacitor 25 is connected between the anode of the second diode 23 and the tap on the tapped resistor 22. A third filter capacitor 26 is connected between the aforesaid tap and a common ground connection. A pair of filter output terminals are arranged with one terminal connected to the tap on the tapped resistor and the other terminal connected to the comon ground connection.

Figure 3:
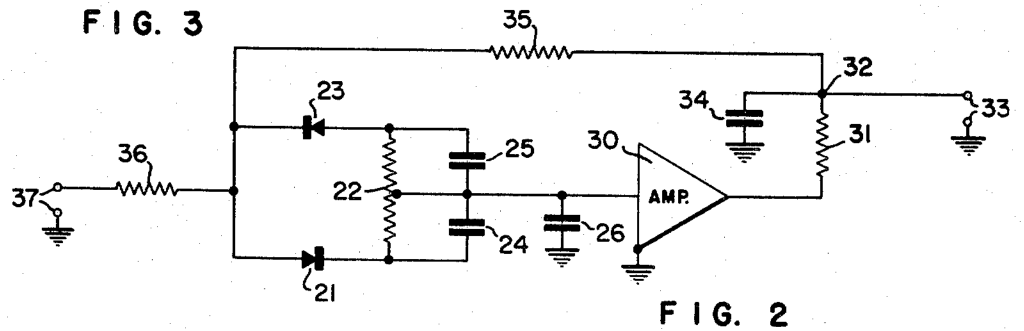
FIG. 3 is a schematic representation of a modification of the filter shown in FIG. 2 also for use with the amplifier shown in FIG. 1.

A modification of the filter circuit shown in FIG. 2 which is also suitable for use with the present invention is shown in FIG. 3. This filter circuit comprises the circuit shown in FIG. 2, with the same reference numerals being used for similar elements, and a feedback loop around this circuit. The feedback circuit comprises an amplifier 30 which has its input circuit connected to the tap on the tapped resistor 22. The output circuit of the amplifier 30 is connected through an output resistor 31 to a common point 32. A pair of filter output terminals 33 has one terminal connected to the common point 32 and the other terminal connected to a common ground connection. A bypass capacitor 34 is connected between the common point 32 and the common ground connection. A feedback resistor 35 is connected to the cathode of the second diode 23. An input resistor 36 is connected between one of a pair of input terminals 37, and the cathode of the second diode 23. The other one of the input terminals 37 is connected to the common ground connection.

The operation of the filter circuit shown in FIG. 2 is effective to separate a desired slowly changing output signal from an undesired concurrent high frequency alternating current signal superimposed on the desired signal. The time constants in the filter circuits are arranged to be high in relation to the period of the frequency of the aforesaid superimposed high frequency signal. Thus, the combination of the first filter capacitor 25 and the portion of the resistance of the tapped resistor 22 between the tap and first capacitor 25 has a high time constant. Similarly, the second filter capacitor 25 and the resistance between the tap on the tapped resistor 22 and this capacitor is arranged to be a high time constant combination. Further, the first and second capacitors 24, 25 are arranged to have capacitances equal to each other. In operation, the first and second diodes 21, 23 conduct alternately; i.e., the first diode 21 conducts when the input signal is at a maximum amplitude and the second diode 23 conducts when the input signal is at a minimum amplitude. Since, as mentioned above, the time constants of the circuit are large with respect to the high frequency signal, the circuit is insensitive to the high frequency amplitude variations. Accordingly, only the conduction of the first and second diodes 21, 23 on the maximum and minimum amplitudes of the slowly changing signal is effective to produce an output signal across the third filter capacitor 26. This output signal appears across the output terminals 27 as the filter output signal and comprises a series of step signals whose maximum and minimum amplitudes are equal, respectively, to the maximum and minimum amplitudes of the slowly changing input signal which caused the first and second diodes 21, 23 to conduct. Thus, the output signal is a representation of the desired signal without the previously superimposed high frequency signal.

The filter circuit shown in FIG. 3 is a modification of the filter circuit shown in FIG. 2 for use in a separation process wherein the frequency of the desired signal approaches that of the undesired high frequency signal. As previously mentioned, the modified circuit comprises the circuit of FIG. 2 with the addition of a feedback loop. The operation of the filter shown in FIG. 3 is similar to that previously described in relation to FIG. 2 with the further effect of the feedback signal, which signal, it is to be noted, was the output signal of the circuit shown in FIG. 2. Thus, the signal appearing across the third capacitor 26 is amplified by the amplifier 30 and is fed back through an output resistor 31 to the input circuit to the first and second diodes 21, 23. Accordingly, the amplified signal from the third capacitor 26 appears across the output resistor 31 which resistor is connected to the output terminals 33. Thus, the output signal from the modified filter is an amplified version of the output signal from the circuit of FIG. 2 and is a representation of the desired portion of the input signal. As mentioned above, this output signal is fed back to the input circuit of the filter and is arranged to oppose the signal appearing at the input terminals 37. Thus, the signal applied to the first and second diodes 21, 23 has a minimum magnitude of the low frequency signal and the superimposed high frequency signal. Accordingly, the diode circuit and the R–C circuits are able to differentiate between the two signals, even though responding to both signals, since they are not overwhelmed by two large signals whereby the small difference in frequency would not measurably affect the amplitude of the output signal.

Thus, it may be seen that there has been provided, in accordance with the present invention, a signal reproduction compensator for neutralizing the effect of distortion in the reproduction of recorded information signals.

What is claimed is:

1. A compensating amplifier comprising a first signal limiting means having a controllable limiting level, means for connecting said limiting means to a source of frequency modulated signals to be compensated, a first discriminator means responsive to the output signal from said first limiting means, said first discriminator means being effective to produce an output signal which is proportional to the product of the amplitude and frequency of an input signal applied thereto, a second signal limiting means having a controllable limiting level, means for connecting said second limiting means to a source of frequency modulated reference signals, a second discriminator means responsive to the output signal from said second limiting means, said second discriminator means being effective to produce an output signal which is proportional to the product of the amplitude and frequency of an input signal applied thereto, filter means responsive to said output signal from said second discriminator means to filter said output signal, and means connecting an output signal from said filter means to said first and said second limiting means to control the limiting level thereof.

2. A discriminator and signal limiting circuit for producing an output signal which is proportional to the product of the amplitude and frequency of an input signal applied thereto comprising an input circuit, a first diode, a second diode, means connecting the anode of said first diode to the cathode of said second diode and to said input circuit, said first diode having its cathode connected to a ground point, a limiting level signal terminal, said terminal being connected to the anode of said second diode, a third diode, a fourth diode, means connecting said cathode of said third diode to the anode of said fourth diode, a connecting capacitor for connecting the anode of said fourth diode to the anode of said first diode, said third diode having its anode connected to a ground point, a bypass capacitor, means connecting said bypass capacitor between the cathode of said fourth diode and a ground point, a bypass resistor connected between said cathode of said fourth diode and said terminal, and an output circuit connected across said bypass capacitor.

3. A filter circuit comprising an input circuit, a first diode, a second diode, resistive means connecting the anode of said first diode to the cathode of said second diode and to said input circuit, a tapped resistor having its ends connected between the cathode of said first diode and the anode of said second diode, a first capacitor, a second capacitor, means connecting said first capacitor between said cathode of said first diode and the tap on said tapped resistor, means connecting said second capacitor between said anode of said second diode and said tap on said tapped resistor, a third capacitor connected between said tap on said tapped resistor and a ground point, an amplifying means connected to amplify a signal appearing across said third capacitor, a feedback circuit connected to apply an output signal from said amplifying means to said input circuit, and a pair of output terminals connected to have an output signal from said third capacitor appear thereacross, said filter circuit being insensitive to a preselected frequency signal and being effective to pass other frequency signals.

4. A compensating amplifier comprising a first signal limiting means having a controllable limiting level, means for connecting said limiting means to a source of frequency modulated signals to be compensated, a first discriminator means responsive to the output signal from said first limiting means comprising a first diode, a second diode, means connecting the anode of said first diode to the cathode of said second diode and to said input circuit, said first diode having its cathode connected to a ground point, a limiting level signal terminal, said terminal being connected to the anode of said second diode, a third diode, a fourth diode, means connecting said cathode of said third diode to the anode of said fourth diode, a coupling capacitor for connecting the anode of said fourth diode to the anode of said first diode, said third diode having its anode connected to a ground point, a bypass capacitor, means connecting said bypass capacitor between the cathode of said fourth diode and a ground point, a bypass resistor connected between said cathode of said fourth diode and said terminal, and an output circuit connected across said bypass capacitor, said first discriminator means being effective to produce an output signal which is proportional to the product of the amplitude and frequency of an input signal applied thereto, a second signal limiting means having a controllable limiting level, means for connecting said second limiting means to a source of frequency modulated reference signals, a second discriminator means responsive to the output signal from said second limiting means comprising a first diode, a second diode, means connecting the anode of said first diode to the cathode of said second diode and to said input circuit, said first diode having its cathode connected to a ground point, a limiting level signal terminal, said terminal being connected to the anode of said second diode, a third diode, a fourth diode, means connecting said cathode of said third diode to the anode of said fourth diode, a coupling capacitor for connecting the anode of said fourth diode to the anode of said first diode, said third diode having its anode connected to a ground point, a bypass capacitor, means connecting said bypass capacitor between the cathode of said fourth diode and a ground point, a bypass resistor connected between said cathode of said fourth diode and said terminal, and an output circuit connected across said bypass capacitor, said second discriminator means being effective to produce an output signal which is proportional to the product of the amplitude and frequency of an input signal applied thereto, filter means responsive to said output signal from said second discriminator means to filter said output signal, and means connecting an output signal from said filter means to said first and said second limiting means to control the limiting level thereof.

5. A compensating amplifier as set forth in claim 1 wherein said filter means comprises an input circuit, a first diode, a second diode, means connecting the anode of said first diode to the cathode of said second diode and to said input circuit, a tapped resistor having its ends connected between the cathode of said first diode and the anode of said second diode, a first capacitor, a second capacitor, means connecting said first capacitor between said cathode of said first diode and the tap on said tapped resistor, means connecting said second capacitor between said anode of said second diode and said tap on said tapped resistor, a third capacitor connected between said tap on said tapped resistor and a ground point, and an output circuit connected across said third capacitor.

6. A compensating amplifier as set forth in claim 5 wherein said output circuit connected across said third capacitor includes an amplifying means connected to amplify a signal appearing across said third capacitor, a feedback circuit connected to apply an output signal from said amplifying means to said input circuit, and a pair of output terminals connected to have an output signal from said third capacitor appear thereacross.

7. A compensating amplifier comprising a first signal limiting means having a controllable limiting level, means for connecting said limiting means to a source of frequency modulated signals to be compensated, a first discriminator means responsive to the output signal from said first limiting means, said first discriminator means being effective to produce an output signal which is proportional to the product of the amplitude and frequency of an input signal applied thereto, a second signal limiting means having a controllable limiting level, means for connecting said second limiting means to a source of frequency modulated reference signals, a second discriminator means responsive to the output signal from said second limiting means, said second discriminator means being effective to produce an output signal which is proportional to the product of the amplitude and frequency of an input signal applied thereto, and means connecting said output signal from said second discriminator to said first and said second limiting means to control the limiting level thereof.

8. A discriminator and signal limiting circuit for producing an output signal which is proportional to the product of the amplitude and frequency of an input signal applied thereto comprising an input circuit, a first diode, a second diode, means connecting the anode of said first diode to the cathode of said second diode and to said input circuit, said first diode having its cathode connected to a ground point, a limiting level signal terminal, said terminal being connected to the anode of said second diode, a third diode, a fourth diode, means connecting said cathode of said third diode to the anode of said fourth diode, a connecting capacitor for connecting the anode of said fourth diode to the anode of said first diode, said third diode having its anode connected to a ground point, and an output circuit means connected to the cathode of said fourth diode.

9. A compensating amplifier as set forth in claim 5 wherein said output circuit connected across said third capacitor includes an amplifying means connected to amplify a signal appearing across said third capacitor, a feedback circuit connected to apply an output signal from said amplifying means to said input circuit, and a pair of output terminals connected to have an output signal from said third capacitor appear thereacross, and to said first and said second discriminators in amplitude opposition to a center frequency output signal from said discriminators to produce a zero amplitude center frequency output signal from said discriminators.

References Cited in the file of this patent

UNITED STATES PATENTS

| | | |
|---|---|---|
| 2,834,879 | Bauman | May 13, 1958 |
| 2,859,405 | Feldman | Nov. 4, 1958 |
| 2,926,311 | Gabor | Feb. 23, 1960 |
| 3,013,151 | Adams et al. | Dec. 12, 1961 |